Oct. 12, 1926.
1,602,522
L. W. BUGBEE
LENS GRINDING MACHINE
Filed Sept. 19, 1924   3 Sheets-Sheet 1
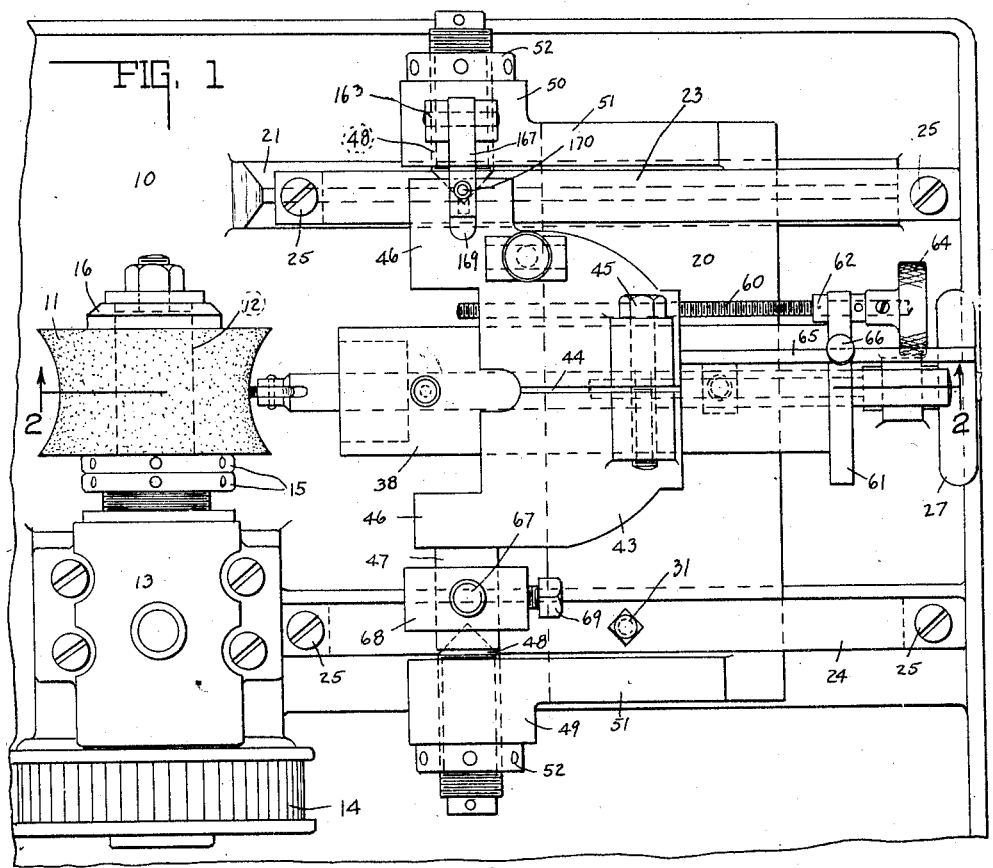
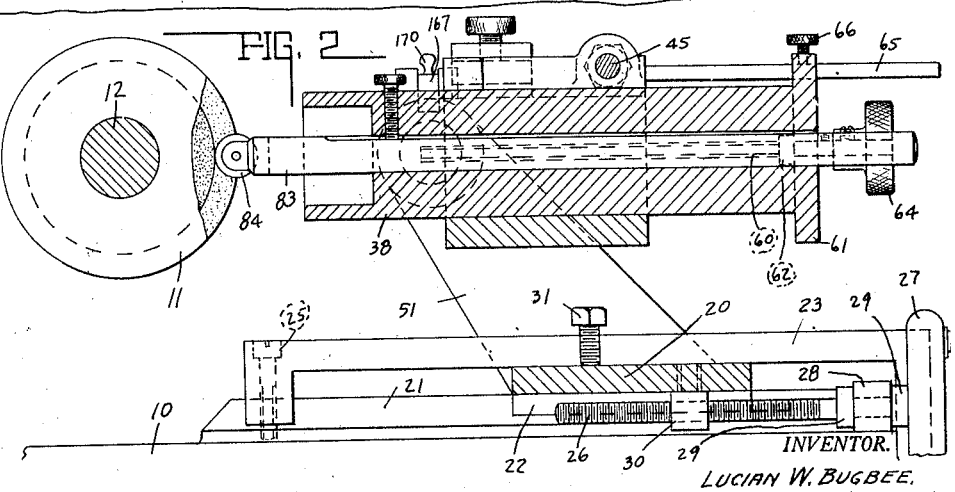
INVENTOR.
LUCIAN W. BUGBEE.
BY
ATTORNEYS.

Oct. 12, 1926.
L. W. BUGBEE
1,602,522
LENS GRINDING MACHINE
Filed Sept. 19, 1924    3 Sheets-Sheet 2
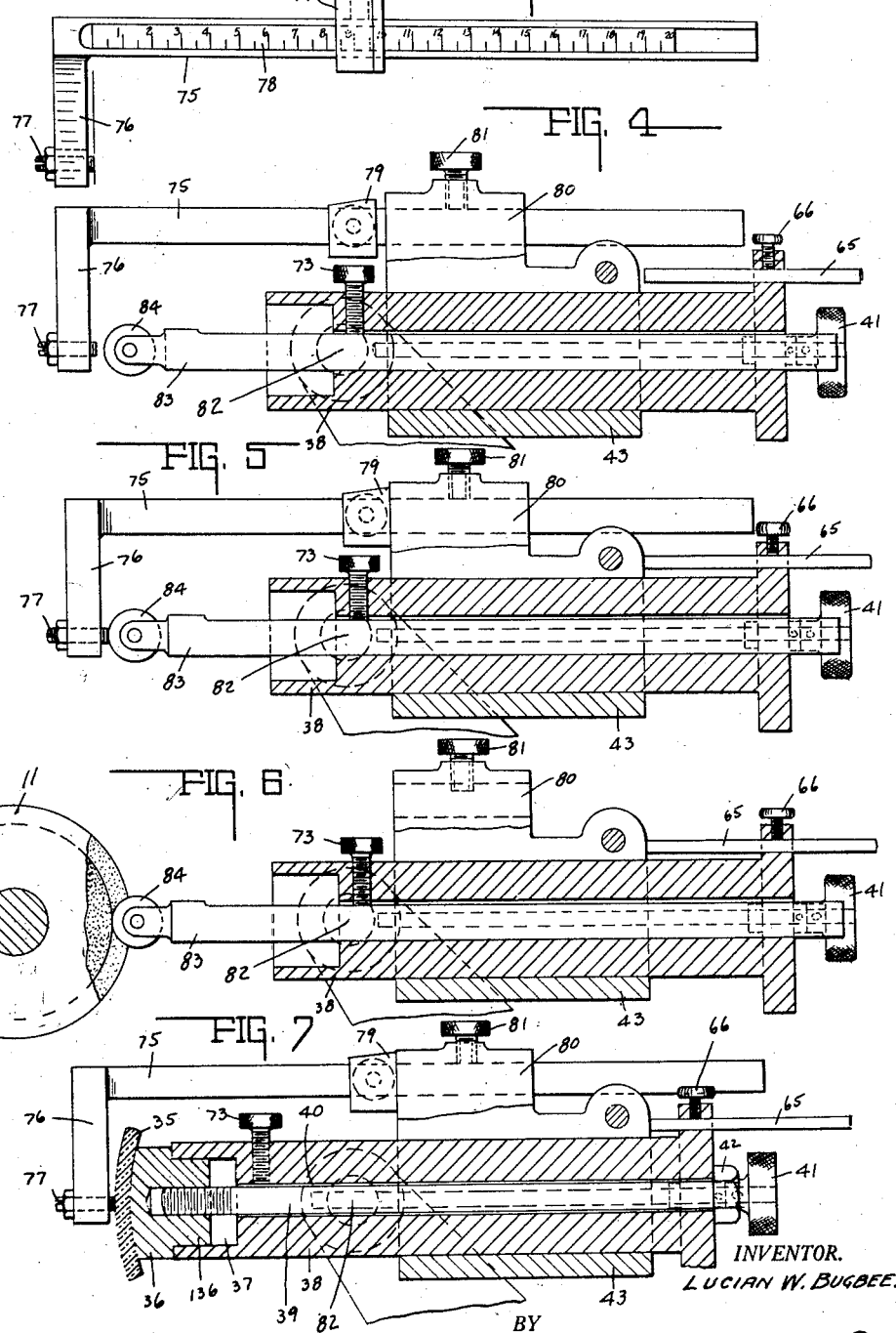
INVENTOR.
LUCIAN W. BUGBEE.
BY
ATTORNEYS.

Oct. 12, 1926.
L. W. BUGBEE
1,602,522
LENS GRINDING MACHINE
Filed Sept. 19, 1924     3 Sheets-Sheet 3
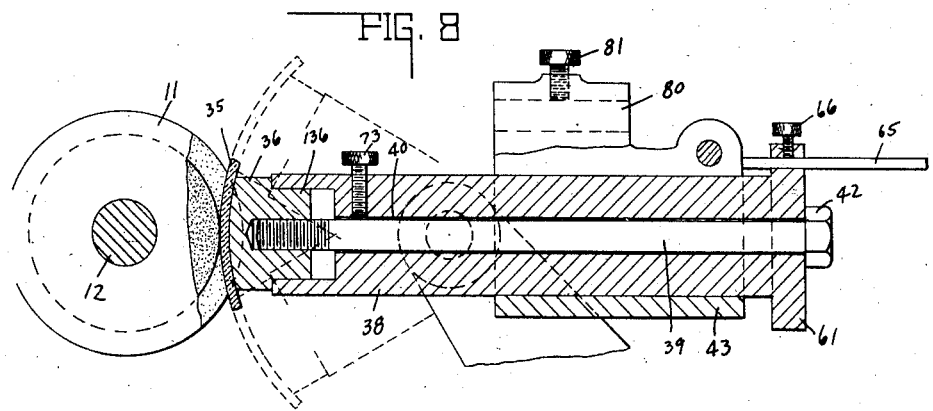
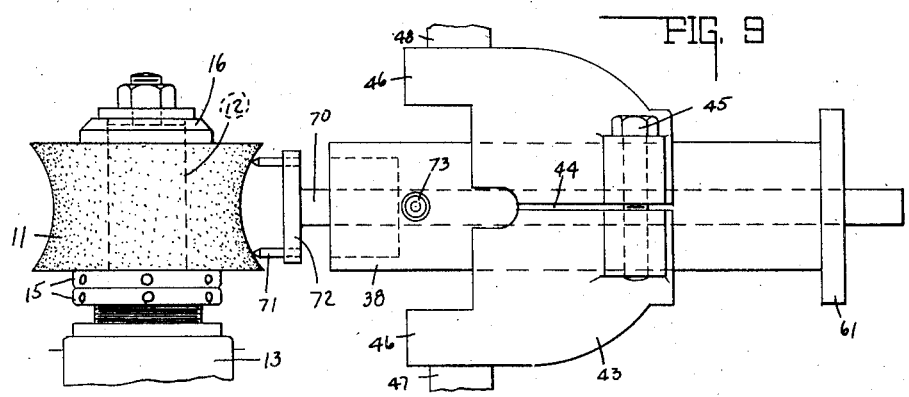
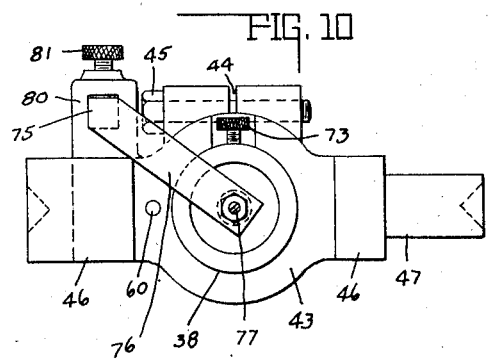
INVENTOR.
LUCIAN W. BUGBEE.
BY
ATTORNEYS.

Patented Oct. 12, 1926.

1,602,522

UNITED STATES PATENT OFFICE.

LUCIAN W. BUGBEE, OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

LENS-GRINDING MACHINE.

Application filed September 19, 1924. Serial No. 738,642.

This invention is a machine for grinding toric surfaces on lenses, on the same general principle as shown in applicant's former application, Serial No. 653,367, filed July 23, 1923, for a machine for generating toric surfaces. It grinds one lens at a time and is particularly adapted for prescription work and for grinding odd types of toric lenses. Its chief virtue is that it grinds a theoretically true torus.

The machine herein shown and described contains several improvements over the machine shown in my former application.

One feature of this invention consists in mounting the grinder, which has a peripheral surface concave transversely, on a table and mounting the lens holding means on a carriage slidable on said table towards and from the grinder, and said lens holding means being mounted on said carriage so as to be capable of oscillating in the plane of the grinder, but have no other movement. The adjustment of the lens holding means enables its fulcrum to be varied to determine the radius of oscillation thereof, whereby the curvature of the lens in one principal meridian is predetermined.

Other features of the improvement consist in securing the lens block or holder in a tubular spindle and providing a bolt extending therethrough for securing the lens holder to the spindle; also in said spindle being longitudinally adjustable in a housing fulcrumed on said carriage, and means for clamping said spindle in adjusted position to prevent any movement thereof independently of said housing; also in providing a housing in which said lens holding spindle is mounted, said housing having means for clamping the spindle and also having lateral bearings in the carriage, and means for locking the carriage in adjusted position so that the fulcrum of said housing can be adjusted to determine the center of oscillation of the lens holding means; also means on the carriage for locking the housing and lens holding means when the latter extends diametrically of the grinder. All these lens holding means are rigidly secured in place against any movement except oscillation of the lens holder in the plane of the grinder so that as the machine is operated, the grinder will determine the curvature in one meridian and the radius of oscillation of the lens holding means will determine the curvature in the other principal meridian. Also with the foregoing there is means for mounting the grinder so that it is adjustable transversely of the lens holder for centering the same with reference to the lens holding means.

Other features of the invention consist in means for adjusting the parts of the grinding machine for accurate operation consisting of a gauge bar with means for slidably mounting the same in connection with the housing for the lens holding means for convenient adjustment of the carriage and lens holding means to obtain a proper radius of oscillation of the lens holding means. Said gauge bar is graduated and has a head that serves as a substitute for the grinder in making such adjustment. Also a gauge rod is longitudinally adjustable in the lens holding spindle for cooperation with said gauge bar, said gauges determining the longitudinal movement and adjustment of the spindle and the gauge rod being used in the final adjustment in connection with the grinder. The objects of these adjustments of the lens holder are to determine the radius of oscillation and also the proper mounting of the lens holder without injury to or interference with the grinder, and in doing this, the lens holding means is oscillated or turned up, away from the grinder while effecting said adjustments. These means for adjustments make the machine practical, accurate and complete and enable it to be satisfactorily used.

The full nature of the invention will be understood from the accompanying drawings and the following description and claims:

In the drawings, Figure 1 is a plan view of a part of said machine for generating toric surfaces on lenses with some of the adjusting means in position and parts broken away. Fig. 2 is a central vertical section on the line 2—2 of Fig. 1, showing parts in side elevation and parts broken away. Fig. 3 is a plan view of a graduated gauge bar for use in the preliminary adjustment of the carriage of the lens holding mechanism in predetermining the center of oscillation of the lens holding means so as to cause the lens to have the desired curvature in the equatorial or one principal meridian. Fig.

4 is a central vertical section through the lens holding means with said graduated gauge bar shown in side elevation, the parts being in unadjusted position. Fig. 5 is the same showing the parts in adjusted position to determine the desired grinding radius. Fig. 6 is a section through the lens holding means and part of the grinding wheel showing said lens holding means in position of final adjusting for the grinding radius, said graduated bar being removed. Fig. 7 is a section through the lens and lens holding means with the graduated bar shown in side elevation for determining the adjustment of the spindle carrying lens block and lens. Fig. 8 is a central vertical section through the lens holding means and a part of the lens grinder, the remainder of the grinder being shown in elevation and different positions of the oscillation of the lens holding means being indicated by dotted lines. Fig. 9 is a plan view of the grinder and the lens holding means with means for centering them with relation to each other. Fig. 10 is an elevation of the left-hand end of Fig. 4.

In the machine herein shown for the purpose of illustrating the general nature of this invention, there is a table or base plate 10 on which the lens grinder and lens holding means are mounted. The lens grinder 11, as herein shown, is a rotary lens grinding wheel with its grinding periphery transversely curved so as to be concave and to determine the meridional curvature of the surface of the lens blank ground. The grinding wheel is adjustable on a shaft 12 mounted and carried in a housing 13 and driven by a sprocket wheel 14 from some suitable source of power. The grinding wheel is longitudinally adjustable on said shaft by being splined thereon and is held in adjusted position thereon by the lock nuts 15 on the threaded portion of the shaft and the lock nut 16 on the other side of the grinding wheel. The particular manner of mounting said grinding wheel so as to make it laterally adjustable and it is immaterial as to which of the two members, the grinding wheel and the lens holding means, is laterally adjustable. All that is necessary is to center them with reference to each other, as hereafter explained, in order for the lens surfaces to be properly generated.

The lens holding mechanism, broadly stated, includes a carriage 20 and all means carried thereby. Said carriage is movable and adjustable towards and away from the grinder and the particular manner of mounting said carriage so as to have such movements on the table 10 constitutes no essential part of this invention. The means for such purpose herein shown includes an upwardly extending track 21 integral or otherwise secured on the table 10. The carriage 20 has an A-shaped groove 22 which rides on said track 21 and guides the carriage in its movements. Said carriage is held in place by two holding bars 23 and 24 that are secured to the table 10 by screws 25. These provide a guideway for the carriage and it is moved by a screw 26 which has on its outer end a hand wheel 27 and the screw is mounted in a bearing 28 on the table 10 and is held from longitudinal movement by collars 29 on said screw and the screw operates in a threaded block 30 secured to the underside of the carriage 20, as seen in Fig. 2. When the hand wheel 27 is moved in one direction, said carriage is fed towards the grinding wheel and when reversed, it is moved away from the grinding wheel. When said carriage is adjusted, it is locked in adjusted position by a set screw 31 extending through one of the guide bars 23, as shown particularly in Fig. 2.

The lens blank 35, as seen in Figs. 7 and 8 is mounted on a lens block 36 which has a reduced portion 136 that extends into a tubular seat 37 in the end of a spindle 38 and is held therein by a screw rod 39 which extends through a central aperture 40 in said spindle, and the screw rod 39 has a head 41 at its right hand end and it can be locked in position by a set nut 42 or a set screw 73 which extends through the spindle, as shown at the left hand of Fig. 7.

The lens holding spindle is longitudinally adjustable in a housing 43 which is centrally split at 44 on the upper side, as shown in Fig. 1, whereby the housing can be clamped by a bolt 45 so as to hold the spindle from movement after its adjustment therein. The housing is oscillatably mounted by means of trunnions 46 and 47 in transverse alignment with each other, and trunnion pins 48, as shown, which are mounted in bearings 49 and 50 on the upper ends of the arms 51 extending upwardly from the carriage, as seen in Figs. 1 and 2. The bearing pins 48 are threaded for adjustment and locked by a collar 52. The axis of said bearing members is the center of oscillation of the lens holding means and fixes the grinding radius or radius of oscillation of the lens holding means and that determines the equatorial curvature of the surface ground on the lens blank.

The spindle 38 is longitudinally adjustable in its housing 43 by means of a screw rod 60 which is mounted in a collar 61 on the right hand end of the spindle and held from movement therein by the collars 62 and is turned by a knurled head 64. The screw rod 60 extends through the threaded aperture in the housing, as seen in Fig. 1. When the spindle is adjusted, it is held in adjusted position by the tightening of the nut 45 of the housing 43, as explained before.

To prevent the lens holding means from being moved towards the grinding wheel far enough to injure its grinding surface, a stop rod 65 is secured in the collar 61 of the spindle by a set screw 66 and the end of the stop rod abuts against the housing 43.

The foregoing description explains the construction of the machine for grinding lenses. It is seen that the lens is not rotated while being ground, as the lens holder has no movement except oscillation in the plane of the grinder. The operation of the machine after its adjustment is illustrated in Fig. 6, the grinder being rotated and the lens holding means being oscillated in a vertical plane, as indicated to move and hold against the grinding face the lens blank, which causes the ground surface of the lens blank to have a meridional curvature, the same as the transverse curvature of the grinder, and an equatorial curvature concentric with the center of oscillation of the lens holding means.

The lens holding mechanism is oscillated in the machine herein shown by a handle 67 in a collar 68 held on the tumbler 47 by a set screw 69, as seen in Figs. 1 and 10, although the invention is not limited to any special means for causing such oscillation. During the adjustment, the lens holding means, including the housing 43, are locked against oscillation with the spindle 38 in horizontal position by a locking bar 167, shown in Fig. 1, that is, hinged between the two ears 168 to the non-oscillatory bearing 50, so that the lock 167 can be turned down into a recess 169 in the tumbler 46 and thus lock the housing against oscillation. The lock 167 has a finger piece 170 on it for lifting it up out of engagement with the member 46 so as to permit the oscillation of the lens holding means.

The means for adjusting the parts of said machine will now be explained. The first adjustment is to center the lens holding mechanism and the grinding mechanism, as indicated in Fig. 9. In the form herein shown the grinding wheel is adjusted axially on the shaft until the center of its transverse concave curvature is cut by the axis of the lens holding means or spindle 38, when the axis of said spindle also cuts the axis of the grinding wheel. During this adjustment a T-shaped gauge 70 is employed. It consists of a rod-like shank portion that is insertable in the central opening of the spindle and is turned until the two pointers 71 on the head 72 are in the same plane as the axis of the grinding wheel. The head 72 is at right angles to the shank of the carriage and the two pins 71 project therefrom equidistant. The gauge is locked in position by the clamp screw 73. Then the spindle 38 is moved towards the grinding wheel by turning the head 64 on the adjusting screw 60 until the two pointers 71 both engage the periphery of the grinding wheel, as shown in Fig. 9. This centers the spindle and grinding wheel. During this operation the clamping screw 45 has been relaxed so as to permit the spindle to be moved longitudinally towards the grinding wheel; after said grinding wheel and lens holder are centered, as explained, the spindle is moved away from the grinding wheel and oscillated upward and the centering gauge 70 is removed.

In order to adjust and properly locate the axis or center of oscillation of the lens holder, so that the grinding radius or radius of oscillation of the lens holder is such as to predetermine the desired equatorial curvature of the lens surface being ground, the following means and method are employed:

A graduated scale bar 75 is employed, substantially as shown in Fig. 3, with a head 76 and an adjustable screw 77 in the end of said head. There is also a millimeter scale 78 and a setting slide 79 thereon. The gauge bar 75 is inserted in a housing or holder 80 therefor, as seen in Fig. 4, and is clamped in position and adjusted by a screw 81. The slide 79 is set on the gauge bar at the desired grinding radius, as indicated by the graduations thereon, said grinding radius extending from the left-hand face of the setting slide 79 to the inner end of the set screw 77 in the head 76 of said gauge, as seen in Fig. 3. When it is mounted in connection with the lens holding means, said gauge bar is moved to the position shown in Fig. 5, so that the setting slide 79 abuts against the housing and it is observed that the thickness of said slide is the same as the distance between the left-hand end of the housing 80 or 43 and the center 82 of the grinding radius or radius of oscillation. Then the set screw 81 is tightened so as to hold the gauge bar 75 in such position. That brings the left-hand edge of the slide 79 in line with the center of oscillation 82. The inner end of the set screw 77, therefore, represents the position of the center of transverse curvature of the grinding face of the grinding wheel.

The next step in this adjustment is to insert in the spindle a gauge rod 83, as seen in Figs. 4 and 5, having in its left-hand end a disk 84 formed of hard rubber or other desired material and rotatably mounted in the end of said gauge rod 83. Then said gauge rod 83 is moved up until said disk 84 engages the inner end of the screw 77, as seen in Fig. 5. At that point the set screw 73 is tightened.

During the foregoing adjustment the carriage has not been moved up to the grinding wheel because the mechanism has not been adjusted to indicate how far up to move it. To do this, the gauge bar 75 is removed, leaving only the gauge rod 83 in place, as shown in Fig. 6, and then the lens holder is oscillated to bring the spindle 38 and gauge rod 83 into horizontal position. At that time it is locked by turning down the lock 167, as shown in Fig. 1. Then the gauge is moved up towards the grinding wheel until the disk 84 at the end of the gauge rod 83 touches the grinding wheel, as seen in Fig. 6. The carriage remains held in its adjusted position by the feed screw 26, whereby it is moved up to the position shown in Fig. 2, and that locates the generating center or center of oscillation of the lens holding means during the grinding of the lens blank and predetermines the equatorial curvature of the surface ground thereon.

The next step in the adjustment is mounting a lens blank on the lens holder. To do this, the lens holding means is unlocked and oscillated from the horizontal position shown in Figs. 2 and 6 to the upper dotted line position shown in Fig. 8, and again the graduated gauge bar 75 is replaced in the machine, as in Fig. 5, and the spindle released from its clamp and slid backward and the gauge rod 83 removed and the lens blank secured on the block 36 and said block inserted in its spindle and held therein by the rod 39 and associated parts, as shown in Fig. 7. Then the spindle is moved up to bring the lens blank against the end of the screw 77, as seen in Fig. 7, and the housing 43 clamped by tightening the nut 45. This insures the spindle against further movement and the lens blank is mounted ready for grinding by oscillating the same vertically, as shown in Fig. 8, across the grinding face of the grinding wheel. This is line grinding of the lens blank, as the grinding wheel and lens blank touch only at one transverse line, but thereby the meridional curvature in determined by the transverse curvature of the grinding face of the wheel and the equatorial curvature by the radius or oscillation of the lens holding means.

For accuracy in the grinding operation, the set slide 79 is readjusted on the gauge bar 75 before it is replaced in association with the lens holder, as shown in Fig. 7, to allow for the thickness of the glass that is to be ground away from the lens blank. This is determined by the operator and the millimeter scale on the gauge bar 75.

As seen in Fig. 10, the gauge bar 75 is set to the left hand of the vertical plane through the center of the lens holding spindle 38 and, therefore, the head 76 of said gauge bar is inclined so as to bring the screw 77 in exact alignment with the center of the spindle 38. It is also noted that the lens holding means is prevented from engaging and injuring the grinding wheel by the stop rod 65, see Fig. 6, which limits the movement of the lens holding means towards the grinder.

The invention claimed is:—

1. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, a housing mounted on said carriage so as to oscillate in the plane of the grinder, a spindle longitudinally adjustable in said housing, and a lens holder mounted in said spindle, whereby the radius of oscillation of the lens holder may be adjusted.

2. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, a housing mounted on said carriage so as to oscillate in the plane of the grinder, a spindle longitudinally adjustable in said housing, a lens holder mounted in said spindle, whereby the radius of oscillation of the lens holder may be adjusted, and releasable means on said carriage for locking said housing when in position for holding the lens holder radially of the grinder.

3. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, a housing pivoted on said carriage and being split, a spindle longitudinally adjustable in said housing, means for clamping said housing for holding the spindle in adjusted position, and a lens holder secured in said spindle, whereby the radius of oscillation of the lens holder may be adjusted.

4. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, a housing mounted on said carriage so as to oscillate in the plane of the grinder, a tubular spindle longitudinally adjustable and secured in said housing, a lens holder mounted in the end of the said spindle, and a bolt extending through said spindle for securing said lens holder in place, whereby the radius of oscillation of the lens holder may be adjusted.

5. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, a housing mounted on said carriage so as to oscillate in the plane of the grinder, a tubular spindle longitudinally adjustable in said housing, a lens holder mounted in the end of said spindle, a bolt extending through said spindle for securing said lens holder in place, and a screw extending through the spindle into engagement with said bolt for preventing it from turning, whereby the radius of oscillation of the lens holder may be adjusted.

6. In a machine for generating toric surfaces on lenses, a table, a rotary grinder mounted thereon with its periphery curved so as to be concave transversely to determine the curvature of the lens in one principal meridian, a carriage slidably mounted on said table, means for adjusting it towards and from the grinder, means for locking said carriage in adjusted position, a housing mounted on said carriage so as to oscillate in the plane of the grinder, a spindle longitudinally adjustable in said housing, and a lens holder mounted in said spindle, whereby the radius of oscillation of the lens holder may be adjusted.

7. In a machine for generating toric surfaces on lens blanks, a rotary grinder with its periphery curved transversely so as to determine the curvature of the lens blank in one principal meridian, a lens holder oscillatable for moving the lens blank to and holding it against the periphery of the grinder, a carriage movable towards and away from the grinder, means carried by the carriage for providing a fulcrum for said lens holder, means for determining the location of the center of oscillation of the lens holder to predetermine the curvature of the lens blank in the other principal meridian, and means for holding the carriage in adjusted position.

8. In a machine for generating toric surfaces on lens blanks, a rotary grinder with its periphery curved transversely so as to determine the curvature of the lens blank in one principal meridian, a lens holding spindle, a housing in which said spindle is mounted so as to be longitudinally adjustable towards and away from said grinder, means for mounting the housing so it will be oscillatable and the axis of oscillation be adjusted towards and away from the grinder, means for determining the position of the axis of said housing with reference to the grinder so as to predetermine the curvature of the lens blank in the other principal meridian, and means for holding said parts in their adjusted positions.

9. In a machine for generating toric surfaces on lens blanks, a rotary grinder with its periphery curved transversely so as to determine the curvature of the lens blank in one principal meridian, a carriage movable towards and away from the grinder, a housing mounted on said carriage and oscillatable on an axis parallel with the axis of the grinder, a lens holding spindle longitudinally adjustable in said housing, means for clamping the spindle in adjusted position in the housing, a gauge for determining the position of the carriage so that the axis of oscillation of said housing and lens holding spindle will be the proper distance from the grinder to cause the lens blank to be ground to the desired curvature, and means for holding the carriage in such adjusted position.

10. In a machine for generating toric surfaces on lens blanks, a rotary grinder with its periphery curved transversely so as to determine the curvature of the lens blank in one principal meridian, a carriage movable towards and away from the grinder, a housing with two laterally extending portions pivotally mounted on said carriage and with an opening through the central part of the housing, a lens holding spindle longitudinally movable in said opening in the housing and towards and away from the grinder, means for clamping the spindle in adjusted position in the housing, a gauge for determining the position of the axis of said housing with reference to the grinder in order to predetermine the curvature in the other principal meridian in the lens blank being ground, and means for holding the carriage in adjusted position.

11. In a machine for generating toric surfaces on lens blanks, a rotary grinder with its periphery curved transversely so as to determine the curvature of the lens blank in one principal meridian, a lens holding spindle, a housing in which said spindle is mounted so as to be longitudinally adjustable towards and away from said grinder, means for mounting the housing so it will be oscillatable and the axis of oscillation be adjusted towards and away from the grinder, means for determining the position of the axis of said housing with reference to the grinder so as to predetermine the curvature of the lens blank in the other principal meridian, means for holding said parts in their adjusted positions, and means for limiting the movement of the spindle towards the grinder and with reference to the housing.

12. In a machine for generating toric surfaces on lens blanks, a rotary grinder with its periphery curved transversely so as to determine the curvature of the lens blank in one principal meridian, a carriage movable towards and away from the grinder, a housing with two laterally extending portions pivotally mounted on said carriage and with an opening through the central part of the housing, a lens holding spindle longitudinally movable in said opening in the housing and towards and away from the grinder, means for clamping the spindle in adjusted position in the housing, a gauge for determining the position of the axis of said housing with reference to the grinder in order to predetermine the curvature in the other principal meridian in the lens blank being ground, means for holding the carriage in adjusted position, a collar on the rear end of the spindle, and an adjustable rod mounted therein in position to engage the housing and limit the movement of the spindle towards the grinder.

13. In a machine for generating toric surfaces on lens blanks, a rotary grinder with its periphery curved transversely so as to determine the curvature of the lens blank in one principal meridian, a lens holding spindle, a housing in which said spindle is mounted so as to be longitudinally adjustable towards and away from said grinder, means for mounting the housing so it will be oscillatable and the axis of oscillation be adjusted towards and away from the grinder, a removable gauge rod adjustable in and longitudinally of said spindle in position to engage the grinder when the center of oscillation is at such distance from the grinder as to cause the lens blank to have the desired curvature in the other principal meridian, and means for holding said parts in their adjusted positions.

14. Means for adjusting a lens holding mechanism in relation to a grinder, including the combination with a grinder, and oscillatable means for holding the lens blank in proper position for treatment with the grinder, of a gauge bar slidably mounted on said lens holder having a head adapted to be held in front of the lens holder for indicating the desired radius of oscillation of the lens holder between the fulcrum thereof and the head of said gauge bar, a gauge rod centrally mounted in association with said lens holding means and projecting beyond the same to engage the arm of said gauge bar, and means for securing said gauge bar and gauge rod in their adjusted positions.

15. Means for adjusting a lens holding mechanism in relation to a grinder, including the combination with a grinder, and oscillatable means for holding the lens blank in proper position for treatment by said grinder, of a graduated gauge bar slidably mounted in said lens holding means having a head adapted to be held in front of the lens holder, a setting slide on said gauge bar to enable the gauge bar to be set in proper position for indicating the desired radius of oscillation of the lens holder between the fulcrum thereof and the head on said gauge bar, a gauge rod centrally mounted in association with said lens holding means and projecting beyond the same to engage the arm of said gauge bar, and means for securing said gauge bar and gauge rod in their adjusted positions.

In witness whereof, I have hereunto affixed my signature.

LUCIAN W. BUGBEE.